(12) United States Patent
Foster

(10) Patent No.: US 10,787,234 B2
(45) Date of Patent: Sep. 29, 2020

(54) DATA CAPTURE DEVICE AND SYSTEM

(71) Applicant: Hegel Industrial Solutions Pty Ltd, Cannonvale (AU)

(72) Inventor: Darren James Foster, Brisbane (AU)

(73) Assignee: Hegel Industrial Solutions Pty Ltd, Cannonvale (AU)

( * ) Notice: Subject to any disclaimer, the term of this patent is extended or adjusted under 35 U.S.C. 154(b) by 0 days.

(21) Appl. No.: 15/313,412

(22) PCT Filed: May 22, 2015

(86) PCT No.: PCT/AU2015/050263
§ 371 (c)(1),
(2) Date: Nov. 22, 2016

(87) PCT Pub. No.: WO2015/176132
PCT Pub. Date: Nov. 26, 2015

(65) Prior Publication Data
US 2017/0247092 A1 Aug. 31, 2017

(30) Foreign Application Priority Data
May 23, 2014 (AU) .................. 2014901939

(51) Int. Cl.
| *B63C 11/52* | (2006.01) |
| *G01N 29/26* | (2006.01) |
| *G01N 29/11* | (2006.01) |
| *G01N 29/265* | (2006.01) |
| *E02D 5/22* | (2006.01) |
| *E02D 33/00* | (2006.01) |
| *G01N 21/88* | (2006.01) |
| *E02D 5/34* | (2006.01) |

(52) U.S. Cl.
CPC ............... *B63C 11/52* (2013.01); *E02D 5/22* (2013.01); *E02D 33/00* (2013.01); *G01N 21/8851* (2013.01); *G01N 29/11* (2013.01); *G01N 29/262* (2013.01); *G01N 29/265* (2013.01); *E02D 5/34* (2013.01); *G01N 2201/06113* (2013.01); *G01N 2291/0234* (2013.01); *G01N 2291/0258* (2013.01); *G01N 2291/044* (2013.01); *G01N 2291/2626* (2013.01)

(58) Field of Classification Search
CPC ...................................................... B63C 11/52
See application file for complete search history.

(56) References Cited

U.S. PATENT DOCUMENTS

| 3,426,585 A | * | 2/1969 | Zemanek, Jr. | ....... G01N 29/041 73/622 |
| 5,696,577 A | * | 12/1997 | Stettner | ................. G01S 7/4863 250/332 |
| 5,790,620 A | * | 8/1998 | Okazaki | ............. B23K 26/0069 134/1 |

(Continued)

*Primary Examiner* — Bao Long T Nguyen
*Assistant Examiner* — Michael A Berns
(74) *Attorney, Agent, or Firm* — Boyle Frederickson S.C.

(57) ABSTRACT

A data capture device and a data capture system are provided. The data capture device is configured to navigate along an elongate structure. The data capture device includes a surface scanner, for scanning a surface of the elongate structure; and a sensor, for capturing data relating to the elongate structure. The surface scanner and the sensor are configured to capture data relating to a common region.

19 Claims, 9 Drawing Sheets

(56) References Cited

U.S. PATENT DOCUMENTS

| | | | | |
|---|---|---|---|---|
| 5,947,051 | A | 9/1999 | Geiger | |
| 6,772,091 | B1* | 8/2004 | Roberts | G01N 23/223 |
| | | | | 324/644 |
| 7,993,469 | B1 | 8/2011 | Vallapuzha et al. | |
| 8,002,501 | B2* | 8/2011 | Dos Santos | B63C 11/52 |
| | | | | 405/211 |
| 8,525,124 | B2 | 9/2013 | Atwood et al. | |
| 8,542,413 | B2* | 9/2013 | Gillham | B63C 11/48 |
| | | | | 348/81 |
| 8,701,584 | B2* | 4/2014 | Kalwa | B63G 8/38 |
| | | | | 114/313 |
| 9,335,301 | B2* | 5/2016 | Yamano | G01N 29/043 |
| 9,488,567 | B2* | 11/2016 | Sohn | G01N 29/041 |
| 2008/0313915 | A1* | 12/2008 | Dos Santos | B63C 11/52 |
| | | | | 33/568 |
| 2009/0228166 | A1* | 9/2009 | Durkos | G05D 1/0219 |
| | | | | 701/26 |
| 2016/0272291 | A1* | 9/2016 | Outa | B60F 3/0015 |
| 2017/0247092 | A1* | 8/2017 | Foster | B63C 11/52 |
| 2017/0297198 | A1* | 10/2017 | Lawrence, III | B25J 9/1671 |

* cited by examiner

DATA CAPTURE DEVICE AND SYSTEM

TECHNICAL FIELD

The present invention relates to data capture. In particular, although not exclusively, the present invention relates to data capture and monitoring of elongate structures, such as steel piles, concrete piles, posts or underwater pipelines.

BACKGROUND ART

Steel and concrete piles are widely used to support marine structures, such as port structures and the like. These piles are thus exposed to seawater, which can cause corrosion and damage of the piles at and under the water line.

Steel piles exposed to seawater may be susceptible to pitting, wherein corrosion is highly localised. Pitting can lead to a compromise in the structural integrity of the pile. Similarly, concrete pilings are typically reinforced by steel, which is also susceptible to corrosion, particularly when the surrounding concrete is cracked.

Such problems can be difficult to detect, particularly as they often occur underwater, yet can lead to failure of the pile and in turn the marine structure which is being supported. Monitoring of corrosion and damage to piles is thus necessary to ensure the structural integrity of the piles.

Monitoring of corrosion and damage to piles can also be a useful tool when planning maintenance of a marine structure. As such, even corrosion not requiring immediate attention may be monitored for future reference.

Piles are thus often visually inspected, periodically by divers. A diver, often equipped with a camera and measuring tool, inspects the pile for damage. Any damage is then recorded by the camera and measured using the measuring tool.

A problem with such approaches of the prior art is that problems may not be clearly visible to the diver. For example, a problem can occur in a central portion of a pile without being visible on the surface of the pile. Similarly, from a visual inspection it is difficult to determine if a small lesion on the surface of the pile is part of a larger internal problem.

A further problem with such approaches of the prior art is that manual inspection of piles is labour intensive and thus expensive. As a result, spot investigations are generally performed rather than thorough inspections of the piles, which in turn results in disjointed sets of inspection data.

Yet a further problem with such approaches of the prior art is that the inspection data is generally highly subjective. In particular, the inspection data is significantly influenced by the person performing the inspection, as the mapping is done by hand. As such, inspection data from one diver cannot accurately be compared with inspection data from another diver.

As such, the inspection methods of the prior art often provide no more than an educated guess as to the state of the piles being inspected.

Accordingly, there is a need for an improved data capture device and method.

It will be clearly understood that, if a prior art publication is referred to herein, this reference does not constitute an admission that the publication forms part of the common general knowledge in the art in Australia or in any other country.

SUMMARY OF INVENTION

The present invention is directed to a data capture device and system, which may at least partially overcome at least one of the abovementioned disadvantages or provide the consumer with a useful or commercial choice.

With the foregoing in view, the present invention in one form, resides broadly in a data capture device configured to navigate along an elongate structure, the data capture device including:

a surface scanner, for scanning a surface of the elongate structure; and a sensor, for capturing sensor data relating to the elongate structure;

wherein the surface scanner and the sensor are configured to capture data relating to a common region.

Preferably, the data capture device is portable and configured to navigate along the elongate structure in-situ, i.e. an installed elongate structure.

Advantageously, both a surface scanner and a sensor are included on a single device. This may enable more efficient and/or more comprehensive capture of data when compared with the prior art. Furthermore, the surface data and sensor data may be aligned using known reference points of the data capture device.

According to certain embodiments, the data capture device enables automatic or semi-automatic in-situ monitoring of elongate members, such as steel piles, concrete piles, posts or underwater pipelines. Such monitoring is less labour intensive than manual inspection, and may thus be less expensive. As a result, thorough inspection of the elongate structure may be performed regularly and at low cost, which in turn results in coherent inspection data that is more easily analysed.

The sensor may be configured to capture data relating to an inside of the elongate structure. This may enable detection of problems that are not visible on a surface of the elongate structure.

Preferably, the data capture device is configured to operate under water.

Preferably, the surface scanner comprises a laser scanner. Suitably, the laser scanner is a sub-millimetre laser scanner.

Preferably, the sensor is a non-destructive testing (NDT) sensor.

The sensor may comprise a radar scanner. The radar scanner may be configured to measure a size or a depth of reinforcement in the elongate member. For example, the reinforcement can comprise rebar in a concrete pile.

The sensor may comprise an ultrasonic sensor. The ultrasonic sensor may be configured to detect irregularities in steel piles.

According to certain embodiments, the ultrasonic sensor comprises a continuous phased array ultrasonic sensor.

According to certain embodiments, the data capture device includes a plurality of sensors, wherein the plurality of sensors includes at least two different types of sensors, for capturing different types of data relating to the elongate structure.

According to certain embodiments, the data capture device includes an accelerometer. The accelerometer may be used to align the sensor data to real world positions on the elongate structure. Advantageously, the accelerometer provides an ability to align the sensor data in real time.

The data capture device may further include a camera, for capturing image data of the elongate structure. The image data may be used to assist an operator in interpreting the sensor data by providing a context for the sensor data.

The data capture device may include an opening, for receiving the elongate member. The data capture device may be configured to fit fully or partially around the elongate member.

The data capture device may include tracks to facilitate the navigation of the data capture device along the elongate member. The tracks may be configured to apply pressure inwards towards a centre of the opening.

According to certain embodiments, the opening is at least partially separable. The opening may be separable into at least two portions.

The data capture device may further comprise a frame defining the opening, wherein the surface scanner and sensor are configured to move relative to the frame and around the opening.

According to a second aspect, the present invention resides broadly in a data capture system, the data capture system including:

a data capture device according to the first aspect; and a controller, coupled to the data capture device, the controller configured to control navigation or data capture of the data capture device.

The controller may be wirelessly coupled to the data capture device. Alternatively, the controller may be coupled to the data capture device by a wired tether.

The controller is configured to operate independently of a movement of the data capture device.

The data capture system may further include a display screen, for analysing data of the data capture device.

The system may be configured to overlay sensor data on a surface model generated according to the surface data.

According to a third aspect, the invention resides in a data capture device configured to capture data relating to a structure, the data capture device including:

a surface scanner, for scanning a surface of the structure; and a sensor, for capturing data relating to the structure;

wherein the surface scanner and the sensor are configured to capture data relating to a common region.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

Figure 1:
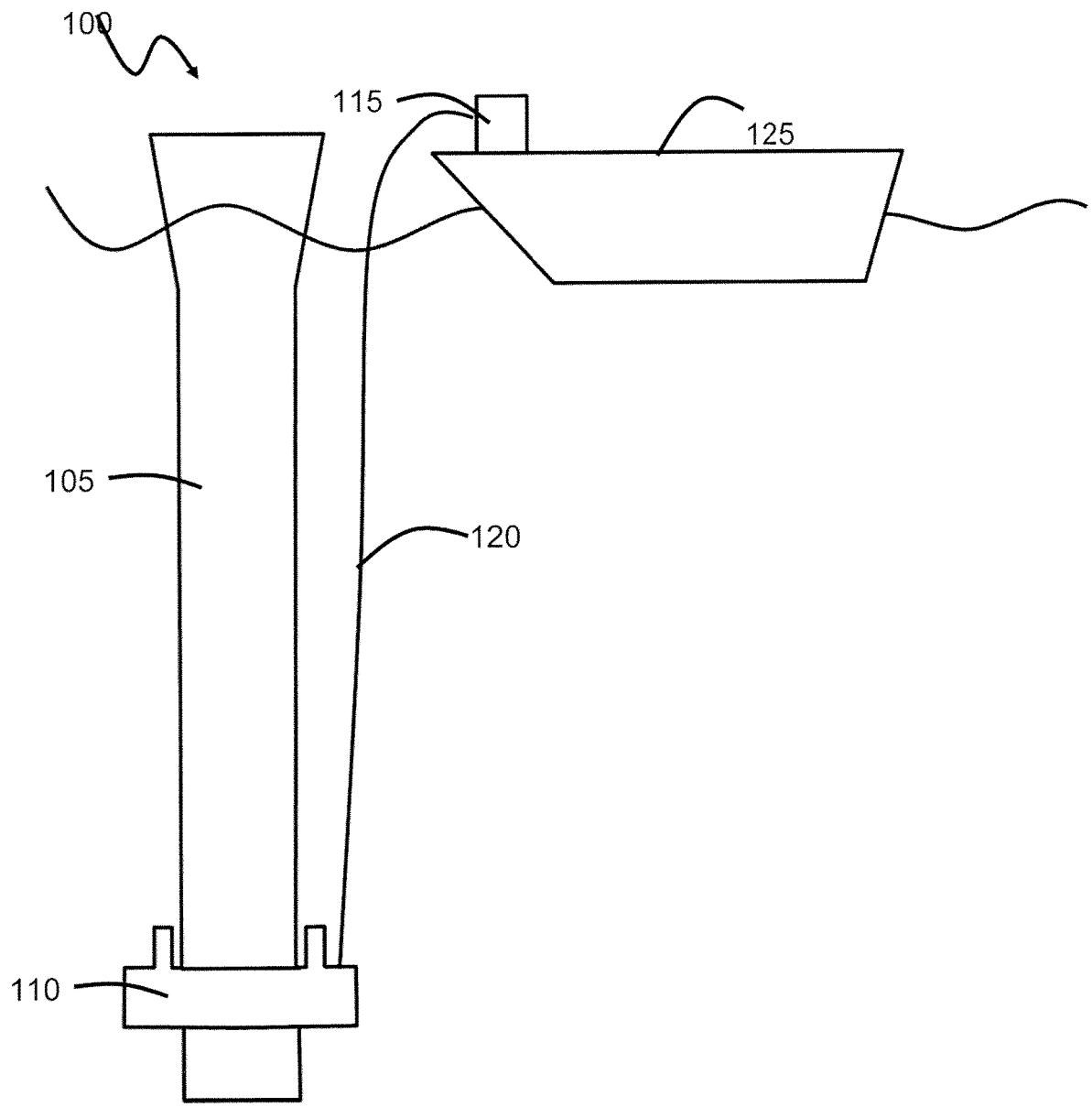
FIG. 1 illustrates a data capture system for inspecting an underwater pile, according to an embodiment of the present invention.

FIG. 1 illustrates a data capture system 100 for inspecting an underwater pile 105, according to an embodiment of the present invention.

Advantageously, the data capture system 100 enables efficient monitoring of the underwater pile 105. Such monitoring can be less labour intensive than manual inspection, and be thus less expensive. As a result, thorough inspection of the underwater pile 105 can be performed regularly and at low cost, which in turn results in coherent inspection data that is more easily analysed.

The monitoring system 100 includes a data capture device in the form of an underwater robot 110, a remote control and monitoring system in the form of a personal computer 115, and a tether 120 coupling the robot 110 to the personal computer 115.

The system 100 is controlled and observed by an operator of the personal computer 110 in a boat 125 that is adjacent to the pile 105. The tether 120 is thus flexible, and of sufficient length to enable the robot 110 to navigate along the pile 105 to a suitable depth.

As discussed in further detail below, the robot 110 includes laser, ultrasonic, radar and imaging sensors, which enable an operator to view and capture data relating to the pile 105 as the robot navigates along the pile 105. The skilled addressee will, however, readily appreciate that any combination of sensors, preferably non-destructive testing (NDT) sensors, may be incorporated onto the robot 110.

The personal computer 110 generally includes a display screen (not illustrated), for presenting the sensor data to the user, however any suitable method of presenting data to the user can be used.

The operator is able to place the robot 110 on the pile 105, and configure the robot 110 to navigate along the pile 105 and capture data. The navigation of the robot 110 along the pile 105 can be fully automated, along with automatic capture and transmission of data, partially automated, or manually controlled.

According to certain embodiments, the operator may choose to manually control an operation of the robot 110, for example to rescan a part of the pile 105, in case suspicious data is initially observed. In such case, the personal computer 115 may include manual navigational controls, for example in the form of a joystick, a touchscreen, or any other suitable data input device, which enable the operator to control movement or data capture of the robot 110.

Figure 2:
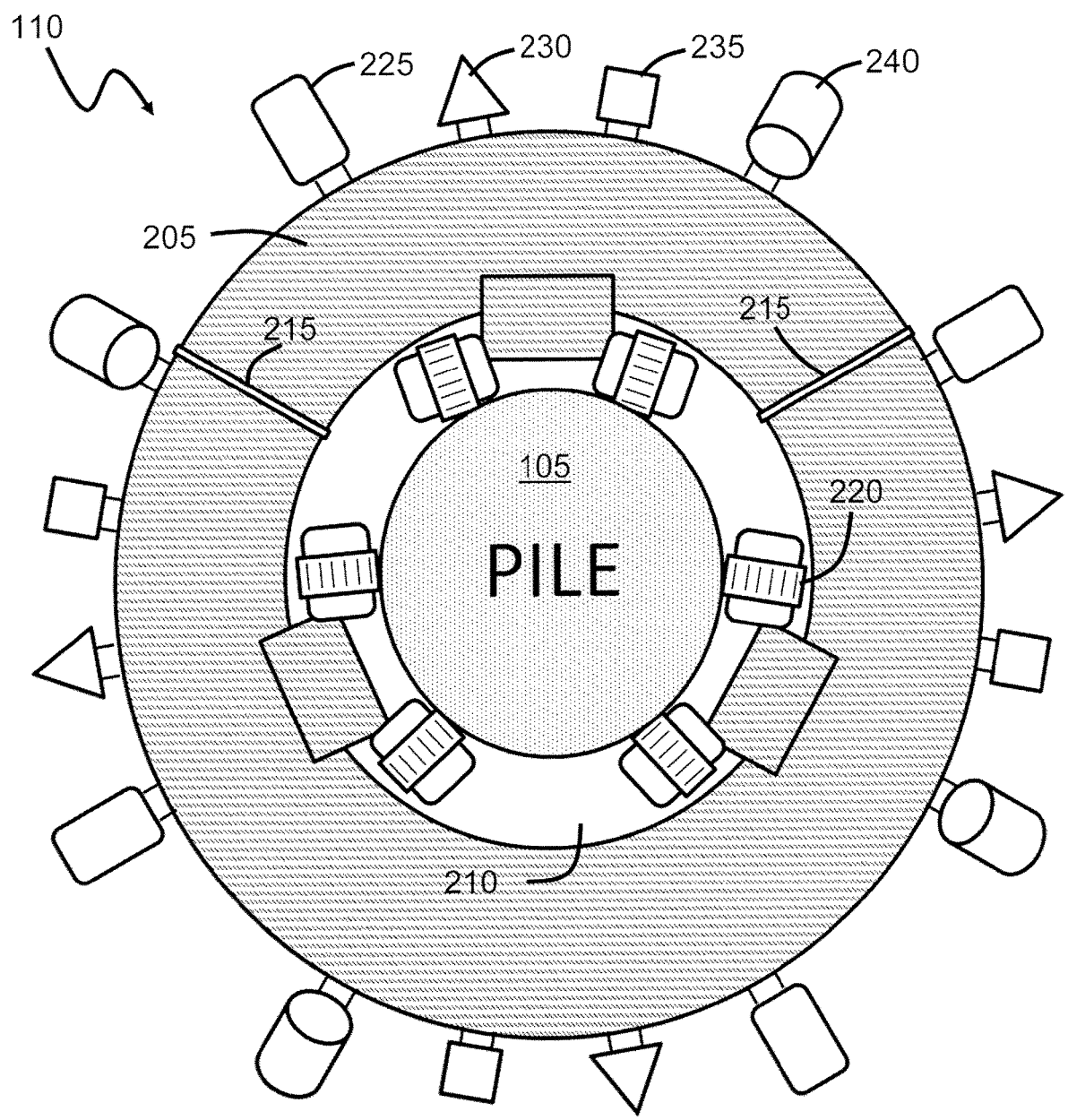
FIG. 2 illustrates a top view of a robot of the data capture system of FIG. 1.

FIG. 2 illustrates a top view of the robot 110 of FIG. 1 around the pile 105.

The robot 110 comprises a frame 205, the frame 205 extending peripherally around the pile 105. The frame 205 is substantially circular in shape and includes an opening 210 in which the pile 105 is received.

The frame 205 includes releasable connectors 215, which enable installation of the robot 110 to the pile 105. In particular, the frame 205 can be opened or separated around the connectors 215 to allow access to the opening 210, and reconnected around the pile 105. The frame can be partially separable or completely separable into at least two portions.

According to certain embodiments (not illustrated), the connectors 215 enable adjustment of the robot 110 to suit piles of different shapes or diameters.

The connectors 215 can include any combination of hinges, bolts, clips and the like to simplify installation of the robot 110 to the pile 105. Advantageously, the releasable connectors 215 do not require the use of tools to be opened and closed.

The robot 110 further includes a plurality of tracks 220, peripherally arranged around the opening 210, which are configured to enable the robot 110 to navigate along the pile 105. The tracks 220 can be formed of rubber or similar material to provide a suitable grip against a surface of the pile 105 and to conform to local irregularities of the pile 105. The tracks 220 are configured to apply pressure inwards towards a centre of the opening 210.

The robot 110 further includes a surface scanner in the form of laser scanners 225, and sensors in the form of phased array ultrasonic scanners 230, radars 235 and cameras 240, for capturing sensor data relating to the pile 105. The surface scanner and sensors are advantageously mounted around a periphery of the frame 205 to provide adequate data capture of the pile 105 without rotating. Alternatively, the surface scanner and sensors may be configured to rotate relative to the frame 205 (or a portion thereof), and thus capture data from various sides of the pile 105.

The surface scanner and the sensors are configured to capture data relating to a common region. This enables the sensor data to be overlaid onto a surface model generated from surface data, as discussed below. This enables the data of the sensors to be viewed in an intuitive manner, but also to be considered in light of the surface data. For example, internal corrosion on a reinforcement member, detected by a sensor, may be associated with a crack on a surface of the pile 105, detected by the surface sensor.

The laser scanners 225 are for generating a three-dimensional surface model of the pile 105. The laser scanners 225 generate a plurality of point measurements, which are together used to generate a three dimensional surface model. The laser scanners 225 can be sub-millimetre laser scanners, to enable detection of small cracks and/or other small defects in the pile 105.

The three dimensional surface model can be generated from the plurality of point measurements using any suitable method. For example, a three-dimensional mesh can be fitted to the plurality of point measurements, which may be filtered.

Figure 3:
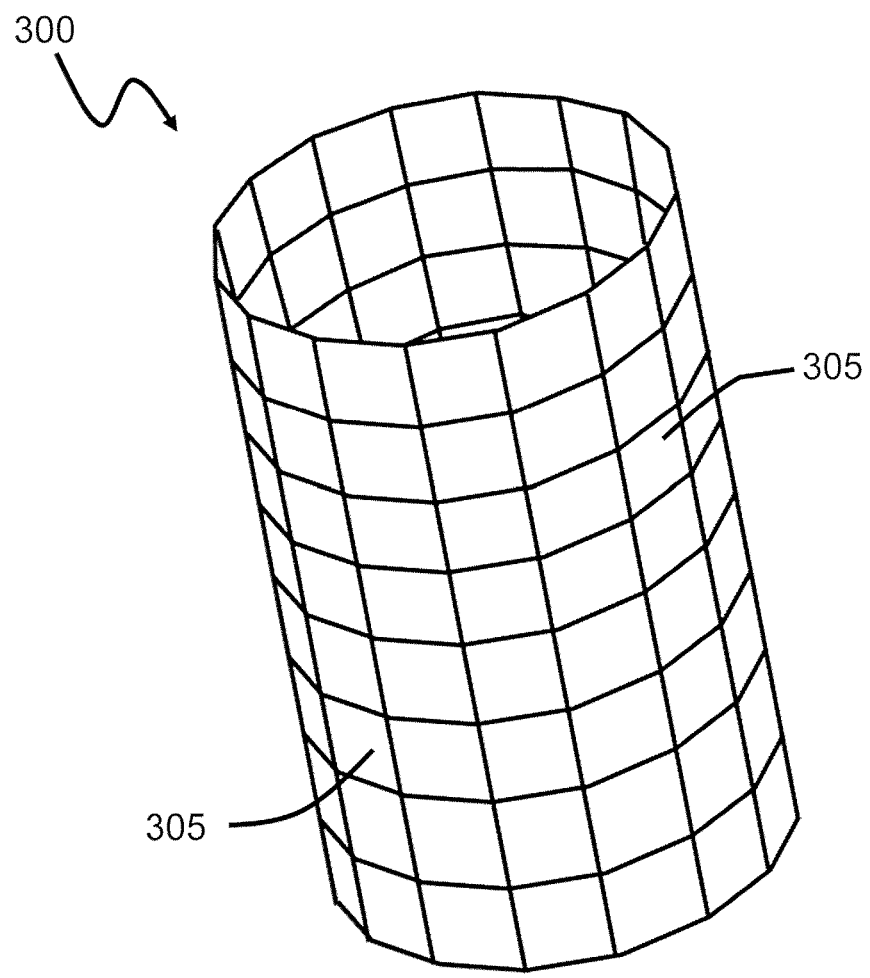
FIG. 3 illustrates a screenshot of a three-dimensional surface model of a portion of the pile of FIG. 1, according to an embodiment of the present invention.

FIG. 3 illustrates a screenshot 300 of a three-dimensional surface model of a portion of the pile 105, according to an embodiment of the present invention. The surface model comprises a plurality of interconnected flat surfaces 305. The flat surfaces 305 are substantially rectangular in shape, and correspond to approximately 50×50 mm sections of the pile 105. Alternatively, the pile 105 can be split into between 16 and 50 sections around a pile that are roughly square in size. The skilled addressee will, however, appreciate that the shape of the flat surfaces 305 may vary depending on a surface of the pile 105.

The laser scanners 225 are also able to identify changes in the pile 105 (when compared with earlier surface data of the pile 105), and detect corrosion or wear based upon the changes. As such, surface data of the pile 105 is advantageously collected over a period of time to enable detection of long term changes in the pile 105.

The phased array ultrasonic scanners 230 are particularly suited to scanning piles 105 made of steel. Data from the phased array ultrasonic scanners 230 can be used to evaluate an internal structure of a steel pile, and thus detect internal corrosion, damage or the like.

The phased array ultrasonic scanners 230 allow a focusing of an ultrasonic beam, to scan the pile 105 at various angles without requiring moving parts. As such, utilisation of the phased array ultrasonic sensors 230 allows the robot 105 to continuously scan the steel pile from various angles without having to rotate to those angles.

Figure 4:
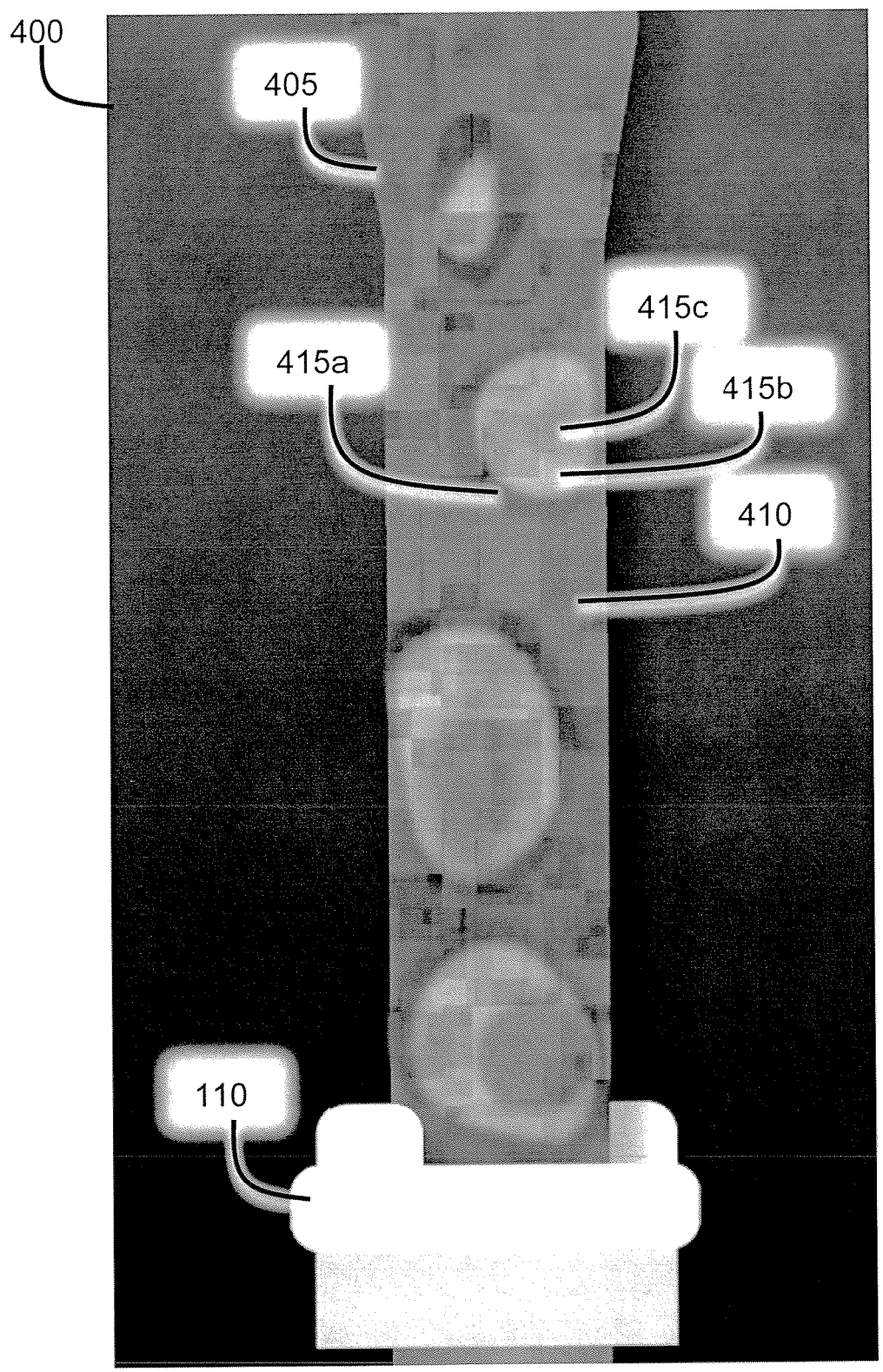
FIG. 4 illustrates a screenshot of an ultrasonic data visualisations screen, according to an embodiment of the present invention.

FIG. 4 is a screenshot 400 of an ultrasonic data visualisation screen, according to an embodiment of the present invention. The ultrasonic data has been processed to generate human readable data wherein different strengths of "echos" of the ultrasonic data are represented using different colours or shading.

In particular, the ultrasonic data visualisation screen includes a pile outline 405 which is visually coded according to the ultrasonic data, as discussed above. The visual coding includes a default coding 410, corresponding to no echo being received within a determined time limit, and first, second and third echo codings 415a, 415b, 415c, indicating a strength of an echo received. The strength of the echo can be an indicator of a size and/or location of an irregularity in the pile 105.

The ultrasonic data can be used to assist in determining a size and a depth of flaws caused by internal corrosion or the like, even when no or minimal corrosion is visible on an outer surface of the pile 105.

Referring back to FIG. 2, the radars 235 are particularly suited for detecting ferrous metals in a pile 105 made of concrete. The radars 235 enable detection reinforcement (rebar) in the concrete, and can assist in determining any corrosion or damage thereto.

Figure 5:
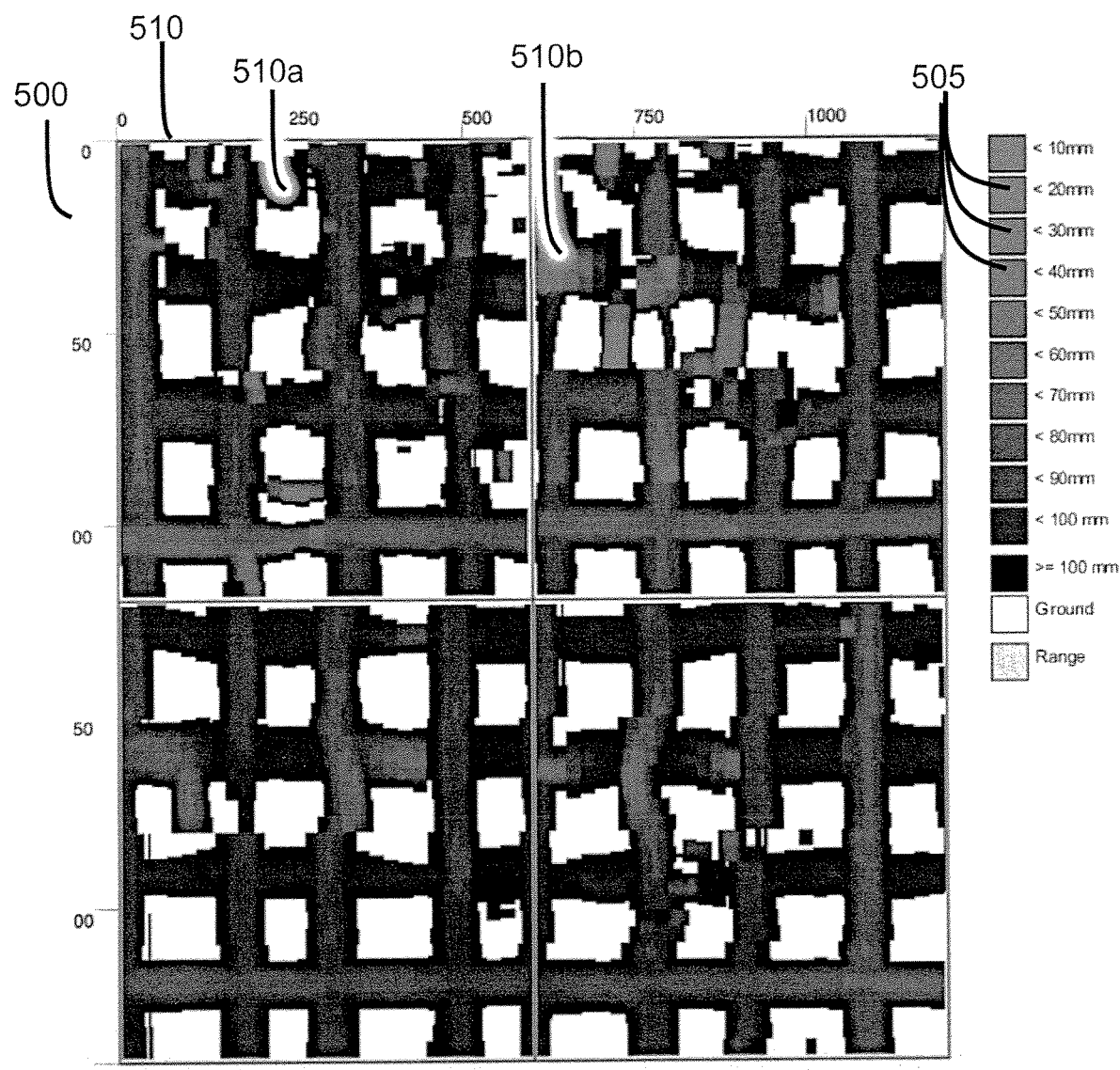
FIG. 5 illustrates a screenshot of a radar data visualisation screen, according to an embodiment of the present invention.

FIG. 5 illustrates a screenshot 500 of a radar data visualisation screen, according to an embodiment of the present invention. The radar data has been processed to generate human readable data in the form of colour and/or shade coding. According to certain embodiments (not shown) radar data is overlaid over a model of the pile 105.

The radar data visualisation screen includes a legend defining a plurality of colour and/or shade coding elements 505, each of which are defined by a strength and/or time delay of echoes of radar data. The coding elements 505 can thus be used to determine a depth of a corresponding reinforcement member.

The radar image 510 includes a first region 510a, corresponding to reinforcement at a depth of approximately 100 mm, and a second region 510b, corresponding to the reinforcement at a depth of approximately 10 mm. The first region 510a and the second region 510b are easily discernable using the coding elements 505. As such, the radar data visualisation screen enables efficient visualisation of reinforcement in a concrete pile.

Referring again back to FIG. 2, the cameras 240 are for capturing images of the pile 105. The cameras enable data, such as the radar or ultrasonic data discussed above, to be viewed together with image data, and thus provide a context to an operator of the system 100. As such, the cameras 240 can be used to assist the operator in interpreting the data in a manner similar to a traditional visual inspection.

Finally, the robot 110 further includes an accelerometer (not illustrated), for measuring an acceleration (and deceleration) of the robot. The accelerometer can be used to help align measured data points with a real world position on the pile 105. For example, combining accelerometer data with sensor data can help give the system 100 the ability to pinpoint problem areas to real world points, and provide an ability to align sensor data in real time.

In addition to being able to view data in real time, the system 100 can be used to output the surface and sensor data for offline analysis by a structural engineer or other suitably qualified person. As an illustrative example, the system 100 can output a computer-aided design (CAD) model, for example in a .CAD, .DXF, .IGES, .STEP, or SolidWorks™ software application file.

Figure 6:
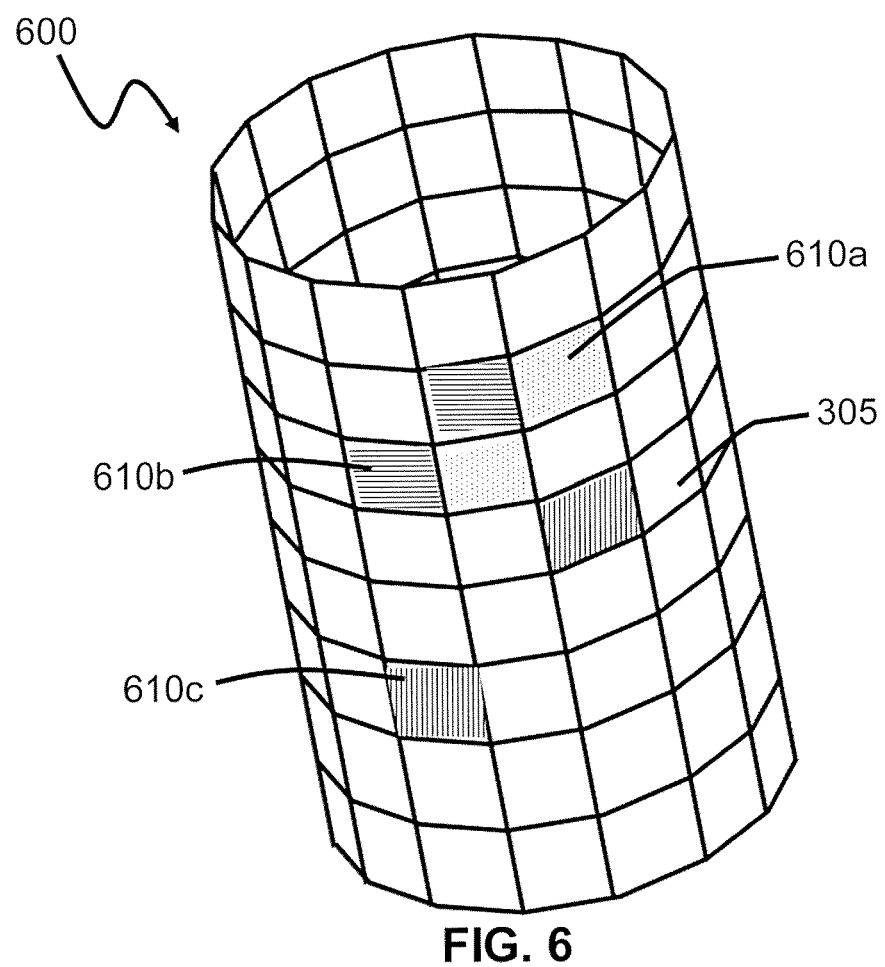
FIG. 6 illustrates a screenshot of a CAD model of the pile of FIG. 1, according to an embodiment of the present invention.

FIG. 6 illustrates a screenshot of a CAD model of the pile 105, according to an embodiment of the present invention.

The CAD model is based upon the three-dimensional surface model of FIG. 3 and includes a plurality of flat surfaces 605. Advantageously, sensor measurements, such as radar and/or ultrasonic measurements, are performed centrally for each of the flat surfaces 605.

Each surface 605 may be assigned a property, which may be used to identify a corresponding thickness of a steel pile, a location of an irregularity or a depth of reinforcement in a steel pile. The properties can be illustrated using texture coding, as illustrated by the first property coding 610a, the second property coding 610b and the third property coding 610c.

According to certain embodiments, an operator is able to view the CAD model with various different types of data overlaid. For example, the operator may toggle between different sensor data (e.g. radar and ultrasonic data) using a suitable data input device. Alternatively, data from multiple sensors can be overlaid simultaneously using different coding schemes.

The data from the sensors may be aligned using known reference points of the data capture device. For example, the sensors can be arranged in a fixed arrangement such that their fields of view are static relative to each other. Such arrangement can be used to transform and/or align the sensor data.

Upon selection of a surface 605, a photo and/or video of the surface can be provided for review by the user.

Figure 7:
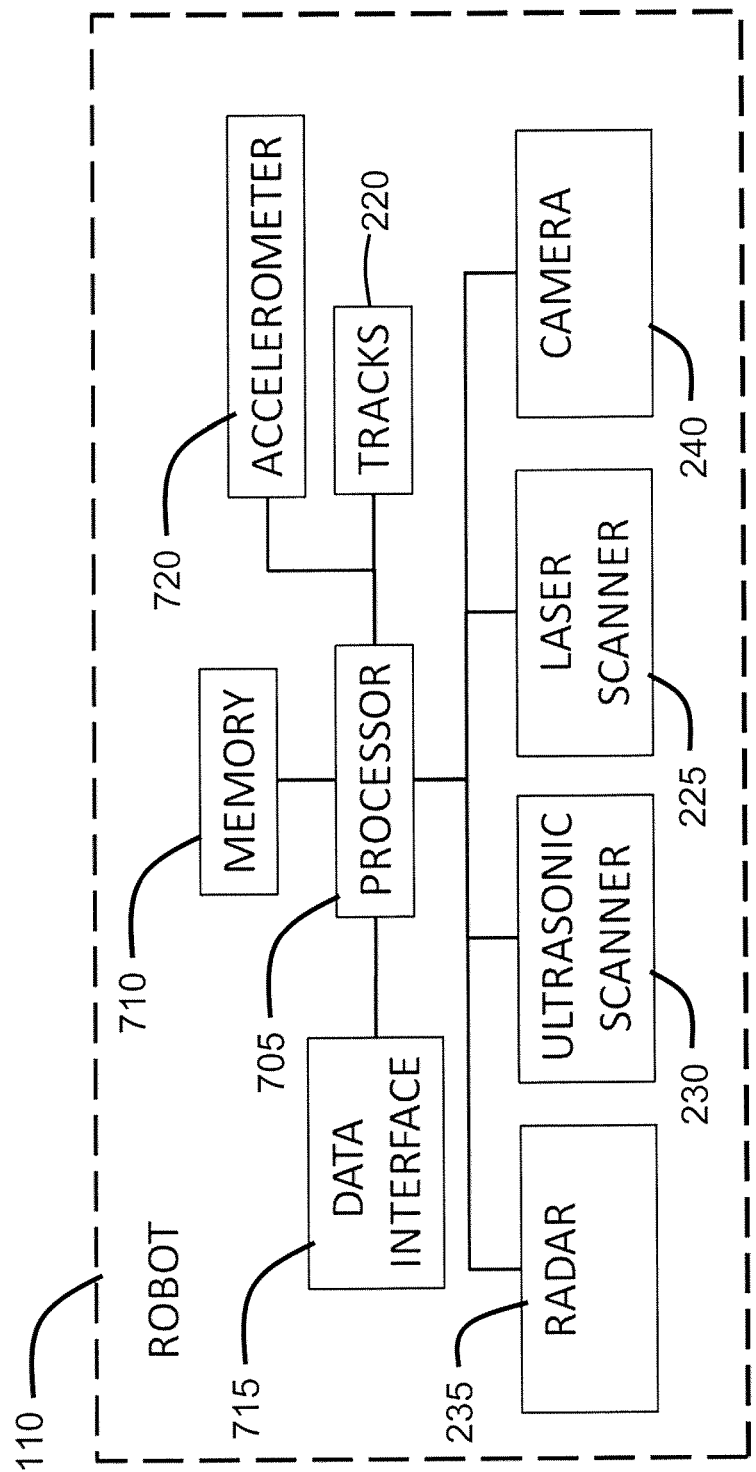
FIG. 7 illustrates a schematic of the robot of the data capture system of FIG. 1.

FIG. 7 illustrates a schematic of the robot 110 of FIG. 1.

The robot 110 includes a processor 705, a memory 710 coupled to the processor 705, and a data interface 715 coupled to the processor. The laser scanner 225, the phased array ultrasonic scanner 230, the radar 235, the camera 240 and the tracks 220 are also coupled to the processor 705.

The memory 710 includes instruction code executable by the processor 705 for capturing data using the laser scanner 225, the phased array ultrasonic scanner 230, the radar 235 and the camera 240, and transmitting the data on the data interface 715.

Furthermore, the memory 710 includes instruction for controlling the tracks 220, and for receiving instructions on the data interface for controlling a navigation of the robot 110. As discussed above, the robot 110 may receive instructions to scan an area of the pile 105 further in case non-typical data is initially collected at that area.

Finally, as discussed above, the robot 110 includes an accelerometer 720 coupled to the processor 705, for estimating an acceleration of the robot 110. The acceleration data can be coupled, by the processor 720, to sensor data, to provide a context to the sensor data. As such, the accelerometer 720 can help align measured data points with a real world position on the pile 105. For example, combining accelerometer data with sensor data can help give the system 100 the ability to pinpoint problem areas to real world points, and provide an ability to align sensor data in real time.

The controller is configured to operate independently of a movement of the data capture device. As such, the tether 120 is flexible to enable movement of the boat 125 in relation to the pile 105, and to enable the robot 110 to move along the pile 105 in a direction away from the boat 125. According to alternative embodiments (not shown), the controller 115 can be wirelessly coupled to the robot 110.

Figure 8:
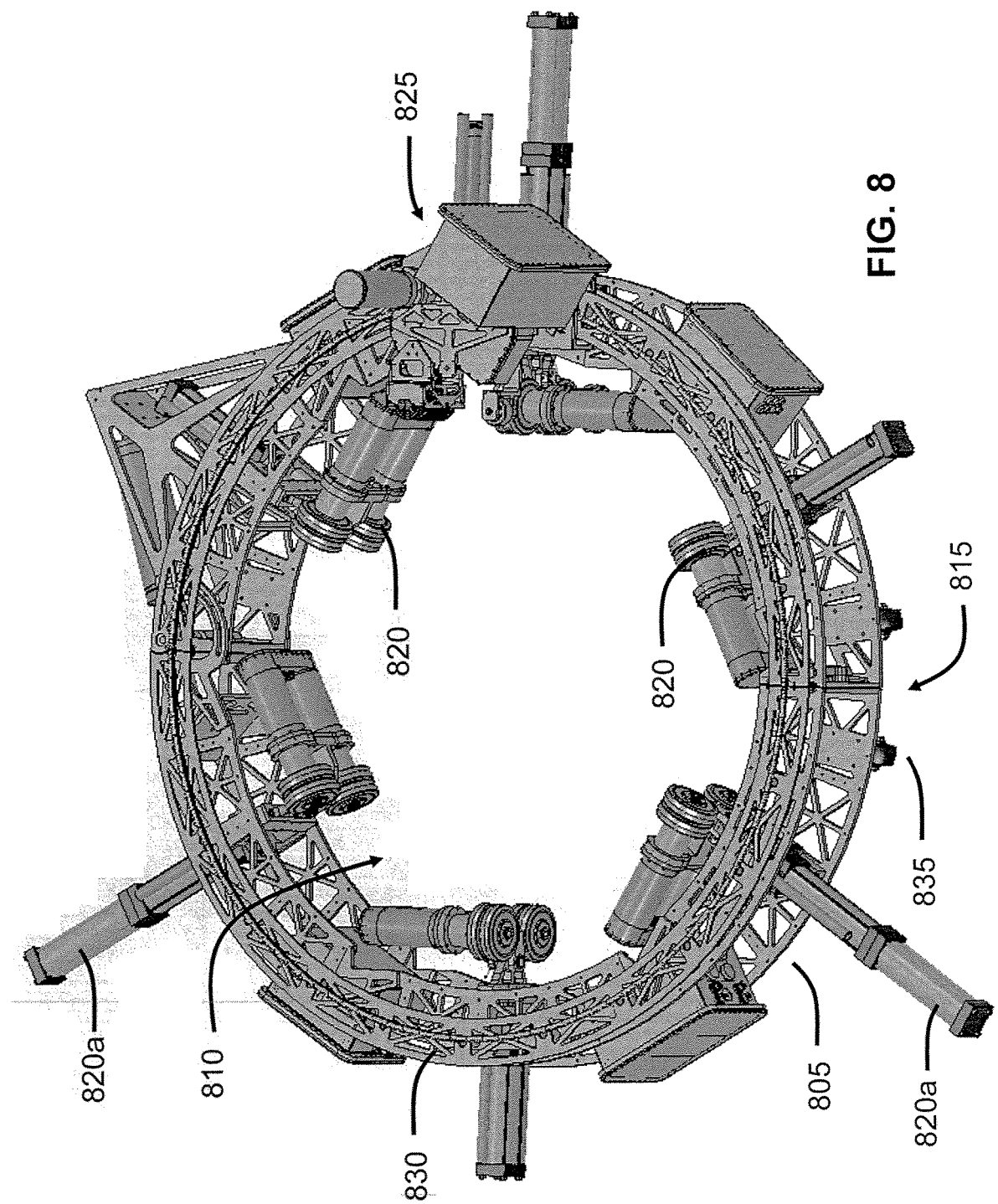
FIG. 8 illustrates an upper perspective view of a data capture device in the form of a robot 800, according to an embodiment of the present invention.

FIG. 8 illustrates an upper perspective view of a data capture device in the form of a robot 800, according to an embodiment of the present invention.

The robot 800 comprises a frame 805, which is configured to extending peripherally around a pile in a similar manner to the frame 205 of FIG. 2. The frame 805 is substantially circular in shape and includes an opening 810 in which the pile 105 is received.

The frame 805 includes releasable connectors 815, which enable the frame to be opened, such that the robot 800 may be installed around the pile 105. In particular, the frame 805 can be opened, providing access to the opening 810, as discussed above.

The robot 800 further includes a plurality of drive wheel 820, peripherally arranged around the opening 810, which are configured to drive the robot 110 along the pile. The drive wheels 820 are coupled to powered extendable arms 820a, which force the drive wheels 820 inwards towards and against the pile 105. As such, the robot 800 can be used on piles of various thickness.

The robot 800 further includes a scanning module 825, as discussed in further detail below with reference to FIG. 9. The scanning module 825 is configured to rotate relative to the frame 805 by driving along a track 830 that extends around the frame 805, and thus capture data from various sides of the pile.

Finally, the robot 800 includes transportation wheels 835, which enable the robot 800 to roll on a flat surface, such as a floor, to assist in moving the robot 800 when not in use.

Figure 9:
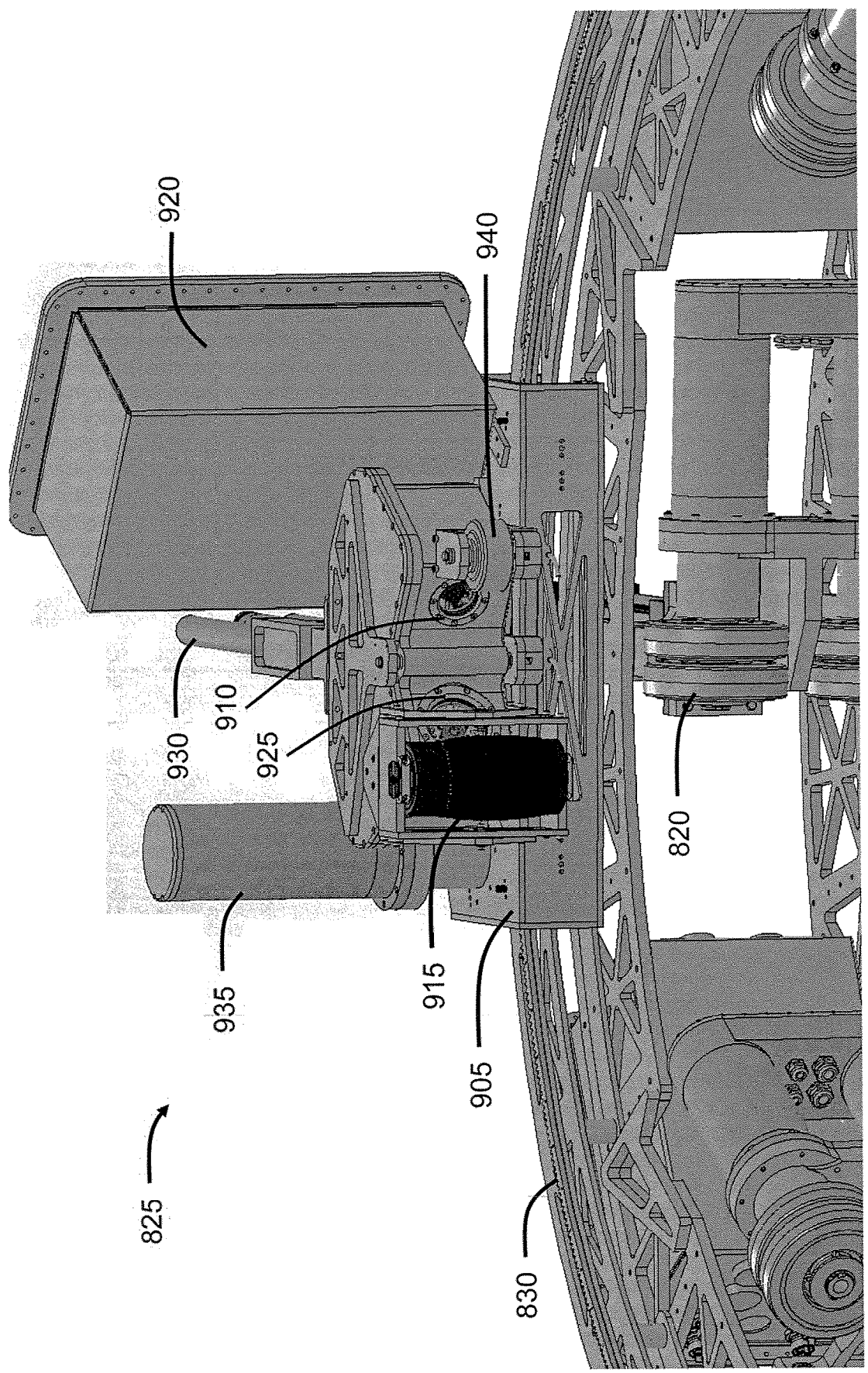
FIG. 9 illustrates an upper perspective view of a portion of the robot of FIG. 8.

FIG. 9 illustrates an upper perspective view of a portion of the robot 800, illustrating the scanning module 825.

The scanning module 825 comprises a base 905, which is configured to move along the track 830, and thus around the opening 810. As best illustrated in FIG. 9. The track 830 is toothed, and a gear (not illustrated) of the base 905 engages with the teeth of the track to accurately move the scanning module 825 around the opening and thus provide rotation.

The scanning module includes a surface scanner in the form of a laser scanner 910, and sensors in the form of an ultrasonic sensor comprising an ultrasonic scan head 915 and ultrasonic scan head unity 920, and a camera 925. The surface scanner and the sensors are configured to capture data relating to a common region, as described above, which enables the sensor data to be overlaid onto a surface model generated from surface data The surface scanner and sensors are configured to extend inwards against the pile, by an extension arm 930, which is controlled by a hydraulic actuator 935. The extension arm 930 functions in a similar manner to the powered extendable arms 820a, and place the surface scanner and sensors adjacent to or against the pile to enable accurate measurement.

The surface scanner engages with the pile, together with a guide wheel 940, to ensure that the surface scanner and sensors are placed a suitable and consistent distance from the pile to enable reliable measurements to be generated.

According to certain embodiments, the robot 800 includes a robotic repair arm (not illustrated) that identifies corrosion, sand blasts the corrosion, and paints over the area in which corrosion existed. In such case, the robot 800 may be completely autonomous in that it not only scans the pile, but also repairs the pile where needed.

According to other embodiments, the robot 800 is adapted to scan a ship or other structure. In such case, the robot 800 may be configured to scan a hull of a ship, while underwater, to identify corrosion and/or damage. In such case, the robot 800 may be configured to travel back and forward along the hull, scanning overlapping or non-overlapping areas to generate a model of the entire hull or a portion thereof.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A data capture device configured to navigate along an elongate structure, the data capture device including:
    at least one body component together defining an opening for receiving the elongate structure, the at least one body component configured to fit fully or partially around the elongate structure, the at least one body component provided with driven tracks or wheels to facilitate self powered, driven navigation of the data capture device along the elongate structure;
    at least one surface scanner including a laser for scanning a surface of the elongate structure and capturing surface data to generate a three-dimensional surface model of the elongate structure, the at least one surface scanner mounted relative to the at least one body component and oriented toward the opening; and
    at least one sensor, for capturing sub-surface sensor data relating to one or more internal regions of the elongate structure from outside the elongate structure;
    wherein the at least one surface scanner and the at least one sensor are spaced from each other along the at least one body component in a fixed arrangement such that their fields of view are static relative to each other, and
    wherein the at least one surface scanner and the at least one sensor are configured positioned spaced from each other along the at least one body component in the fixed arrangement to capture surface data and sub-surface sensor data relating to a common region of the elongate structure and to correlate the surface data for the common region with the sub-surface sensor data for the common region.

2. The data capture device of claim 1, wherein the data capture device is portable and configured to navigate along the elongate structure in-situ.

3. The data capture device of claim 1, wherein the data capture device is configured to operate under water.

4. The data capture device of claim 1, wherein the at least one sensor is a non-destructive testing (NDT) sensor.

5. The data capture device of claim 1, wherein the at least one sensor comprises a radar scanner, configured to measure a size or a depth of reinforcement in the elongate structure.

6. The data capture device of claim 1, wherein the at least one sensor comprises an ultrasonic sensor, configured to detect irregularities in steel piles.

7. The data capture device of claim 1, wherein the data capture device includes a plurality of sensors, wherein the plurality of sensors includes at least two different types of sensors, for capturing different types of data relating to the elongate structure.

8. The data capture device of claim 1, further including an accelerometer.

9. The data capture device of claim 1, further including a camera, for capturing image data of the elongate structure.

10. The data capture device of claim 1, wherein the at least one body component is at least partially separable.

11. The data capture device of claim 1, further comprising a frame defining the opening, wherein the at least one surface scanner and the at least one sensor are configured to move relative to the frame and around the opening.

12. The data capture device of claim 1, wherein each track or wheel is coupled to an extendable arm that is also coupled to the at least one body component.

13. The data capture device of claim 12, wherein each extendable arm is a powered extendable arm that is configured to bias the respective track or wheel toward the elongate structure.

14. The data capture device of claim 1, wherein the tracks or wheels are configured to apply inward pressure towards a center of the opening.

15. A data capture system, the data capture system including:
    a data capture device configured to navigate along an elongate structure, the data capture device including:
        at least one body component together defining an opening for receiving the elongate structure, the at least one body component configured to fit fully or partially around the elongate structure, the at least one body component provided with driven tracks or wheels to facilitate self powered, driven navigation of the data capture device along the elongate structure;
        at least one surface scanner including a laser for scanning a surface of the elongate structure and capturing surface data to generate a three-dimensional surface model of the elongate structure, the at least one surface scanner mounted relative to the at least one body component and oriented toward the opening; and
        at least one sensor, for capturing sub-surface sensor data relating to one or more internal regions of the elongate structure from outside the elongate structure;
        wherein the at least one surface scanner and the at least one sensor are spaced from each other along the at least one body component in a fixed arrangement such that their fields of view are static relative to each other, and wherein the at least one surface scanner and the at least one sensor are configured positioned spaced from each other along the at least one body component in the fixed arrangement to capture surface data and sub-surface sensor data relating to a common region of the elongate structure and to correlate the surface data for the common region with the sub-surface sensor data for the common region;
and
a controller, coupled to the data capture device, the controller configured to control navigation or data capture of the data capture device.

16. The data capture system of claim 15, wherein the controller is wirelessly coupled to the data capture device.

17. The data capture system of claim 15, wherein the controller is configured to operate independently of a movement of the data capture device.

18. The data capture system of claim 15, further including a display screen, for analysing data of the data capture device.

19. The data capture system of claim 15, further configured to overlay sensor data on a surface model generated according to surface data captured by the data capture device.

* * * * *